(12) United States Patent
Eicher et al.

(10) Patent No.: US 9,216,411 B2
(45) Date of Patent: Dec. 22, 2015

(54) METHOD FOR INHIBITING NITROSAMINE FORMATION IN ANION EXCHANGE RESINS

(75) Inventors: Chris Raymond Eicher, Midland, MI (US); Daryl John Gisch, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 37 days.

(21) Appl. No.: 13/337,714

(22) Filed: Dec. 27, 2011

(65) Prior Publication Data

US 2012/0172463 A1 Jul. 5, 2012

Related U.S. Application Data

(60) Provisional application No. 61/427,892, filed on Dec. 29, 2010.

(51) Int. Cl.
| | | |
|---|---|---|
| *B01J 47/04* | (2006.01) | |
| *B01J 47/00* | (2006.01) | |
| *B01J 41/04* | (2006.01) | |
| *C08K 5/32* | (2006.01) | |
| *C08G 14/06* | (2006.01) | |

(52) U.S. Cl.
CPC ............. *B01J 47/006* (2013.01); *B01J 41/043* (2013.01); *C08G 14/06* (2013.01); *C08K 5/32* (2013.01)

(58) Field of Classification Search
USPC ........................................ 521/28; 106/287.26
See application file for complete search history.

(56) References Cited

U.S. PATENT DOCUMENTS

| | | | | |
|---|---|---|---|---|
| 2,341,907 | A * | 2/1944 | Cheetham et al. ............. | 210/683 |
| 4,973,607 | A * | 11/1990 | Stahlbush et al. ................ | 521/28 |
| 5,152,986 | A * | 10/1992 | Lange ..................... | A61K 31/44 |
| | | | | 424/442 |
| 5,543,270 | A * | 8/1996 | Akao et al. ..................... | 430/347 |
| 2008/0163793 | A1* | 7/2008 | Gernon et al. ........... | 106/287.26 |
| 2008/0233242 | A1 | 9/2008 | Zhang et al. | |
| 2008/0319237 | A1* | 12/2008 | Stahlbush et al. ............. | 568/728 |

FOREIGN PATENT DOCUMENTS

| | | | |
|---|---|---|---|
| CN | 101003765 A | | 7/2007 |
| GB | 776664 | * | 6/1957 |
| JP | 11138022 | | 5/1999 |
| JP | 2000-176467 A | | 6/2000 |

OTHER PUBLICATIONS

Jerome M. Kemper, Paul Westerhoff, Aaron Dotson and William A. MtTCH; Nitrosamine, Dimethylnitramine and Chloropicrin Formation during Strong Base Anion-Exchange Treatment, Environmental Science and Technology, vol. 43, No. 2, pp. 466-472 (2009).*
William A. Mitch, Jonathan O. Sharp, R. Rhodes Trussell, Richard L. Valentine, Lisa Alvarez-Cohen and David L. Sedlak; N-Nitrosodimethylamine (NDMA) as a Drinking Water Contaminant: A Review, Environmental Engineering Science, vol. 20, No. 5, pp. 389-404 (2003).*
Douglass, et al., "The chemistry of nitrosamine formation, inhibition and destruction", J. Soc. Cosmet. Chem., vol. 29, pp. 581-606 (1978).*
William A. Mitch, Jonathan O. Sharp, R. Rhodes Trussell, Richard L. Valentine, Lisa Alvarez-Cohen and David L. Sedlak; N-Nitrosodimethylamine (NDMA) as a Drinking Water Contaminant: A Review, Environmental Engineering Science, vol. 20, No. 5, 2003, pp. 389-404.
Jerome M. Kemper, Paul Westerhoff, Aaron Dotson and William A. Mitch; Nitrosamine, Dimethylnitramine and Chloropicrin Formation during Strong Base Anion-Exchange Treatment, Environmental Science and Technology, vol. 43, No. 2, 2009, pp. 466-472.
Issam Najm, et al; NDMA Formation in Water and Wastewater; American Water Works Association; Journal American Water Works Association, Denver, CO, US, vol. 93, Jan. 1, 2001, pp. 92-99, XP008150364.
M. L. Douglass, et al; The Chemistry of Nitrosamine Formation, Inhibition and Destruction; J. Soc. Cosmet. Chem., vol. 29, Sep. 1, 1978, pp. 581-606, XP55024100.

* cited by examiner

*Primary Examiner* — Peter D Mulcahy
*Assistant Examiner* — Henry Hu
(74) *Attorney, Agent, or Firm* — Carl P. Hemenway; Tifani M. Edwards

(57) ABSTRACT

A method for inhibiting formation of nitrosamines and an anion exchange resin produced therefrom comprising providing an anion exchange resin with a nitrosating agent and applying an antioxidant to the resin to inhibit formation of nitrosamines on the anion exchange resin.

7 Claims, No Drawings

METHOD FOR INHIBITING NITROSAMINE FORMATION IN ANION EXCHANGE RESINS

This invention relates to methods for controlling nitrosamine formation in resins. More particularly, this invention relates to methods for inhibiting nitrosamine formation in anion exchange resins by adding antioxidants.

Nitrosamines are known as N-nitrosamines or N-nitrosodialkylamines. There are many types, but one common feature is NNO functionality. Some types of nitrosamines have been demonstrated to cause cancer in laboratory animals as exposed in different ways, including through food, inhalation, dermal contact, and drinking water. According to the 1.0 California Department of Public Health (CDPH), http://www.cdph.ca.gov, levels above 10 ng/L (nanograms per liter) may be of concern.

Trace nitrosamines (i.e., >10 ng/L) that develop in stored and initially installed anion exchange resins have been found and are particularly undesirable in potable water applications. For applications like perchlorate and nitrate remediation, many governmental agencies require that anion exchange resins be pre-washed and tested for any contribution of various nitrosamines at the point of installation. Pre-washing is an added expense in both time and water utilization as in some cases up to 200 bed volumes of water has been required to meet required test levels for nitrosamines.

Nitrosation may be inhibited by using additives that can compete for the active nitrosating intermediate, or nitrosating agent. N-Nitrosamine formation in vitro has been shown to be inhibited by ascorbic acid (vitamin C) and alpha-tocopherol (vitamin E). See, Kirk-Othmer, Encyclopedia of Chemical Technology, 4th Ed. Volume 17, page 227. Antioxidants have also been used to control total organic carbon and color throw in gel cation resins and strong acid cation resins. See, Gisch, Daryl J., "The Effectiveness of Various Food Acceptable Antioxidants for Controlling Leachable Total Organic Carbon (TOC) and Color Throw on Stored Strong Acid Gel Cation Resins," http://priorartdatabase.com/JPCOM/1000125143, May 20, 2005; U.S. Pat. No. 4,973,607. However, none of these methods have been able to limit nitrosamine levels to less than 15 ng/L.

The invention seeks to limit nitrosamine formation and eliminate or lessen the water pre-washing of an anion exchange resin by adding an antioxidant to an anion exchange resin. The use of antioxidants slows or eliminates nitrosamine formation on the resin. By slowing the oxidative release of amines from the resin and by disrupting the mechanism by which nitrosamines form from amine fragments, antioxidants reduce nitrosamine formation. This results in the need for less pre-washing of anion resins for the purpose of removing nitrosamines before bringing them into service for drinking and potable water applications.

In the present invention, there is provided a method for inhibiting formation of nitrosamines comprising providing an anion exchange resin with a nitrosating agent and applying an antioxidant to the resin to inhibit formation of nitrosamines on the anion exchange resin such the anion exchange resin comprises no more than 15 ng/L nitrosamines.

The invention is directed to a method for inhibiting nitrosamine formation in anion exchange resins. An anion exchange resin with a nitrosating agent is provided. The anion exchange resin, preferably, comprises a crosslinked polycondensate of phenol formaldehyde and an amine. In a preferred embodiment, the anion exchange resin comprises dimethylamine, trimethylamine, triethylamine, tripropylamine, tri-n-butyl amine, or mixtures thereof.

The anion exchange resins may be in the form of a gel or macroporous beads. If the anion exchange resins are in the form of macroporous spherical beads, they typically have an average particle diameters from 100 µm to 2 mm and a surface area from about 10 to 1000 square meters/gram ($m^2$/g). The crosslinked copolymer particles may have a Gaussian particle size distribution, but preferably have a relatively uniform particle size distribution, i.e. "monodisperse," i.e., at least 90 volume percent of the beads have a particle diameter from about 0.9 to about 1.1 times the volume average particle diameter.

The anion exchange resins may be prepared from crosslinked macroporous copolymers, which are polymers or copolymers polymerized from a monomer or mixture of monomers containing at least 1 weight percent, based on the total monomer weight, of polyvinyl unsaturated monomer. Porosity may be introduced into the copolymer beads by suspension-polymerization in the presence of a porogen (also known as a "phase extender" or "precipitant"), that is, a solvent for the monomer, but a non-solvent for the polymer.

The copolymer particles may be prepared by suspension polymerization of a finely divided organic phase comprising monovinylidene monomers such as styrene, crosslinking monomers such as divinylbenzene, a free-radical initiator, and optionally, a phase-separating diluent. The terms "gel-type" and "macroporous" are well-known in the art and generally describe the nature of the copolymer particle porosity. The term "macroporous" as commonly used in the art means that the copolymer has both macropores and mesopores. The terms "microporous," "gellular," "gel" and "gel-type" are synonyms that describe copolymer particles having pore sizes less than about 20 Å (Angstroms), while macroporous copolymer particles have both mesopores of from about 20 Å to about 500 Å and macropores of greater than about 500 Å. Gel-type and macroporous copolymer particles, as well as their preparation, are further described in U.S. Pat. No. 4,256,840 and U.S. Pat. No. 5,244,926, the entire contents of which are incorporated herein by reference.

Suitable monomers that may be used in the preparation of the crosslinked copolymers include, for example, one or more monomers selected from divinylbenzene, trivinylbenzene, divinyltoluene, divinylnaphthalene and divinylxylene, and mixtures thereof; it is understood that any of the various positional isomers of each of the aforementioned crosslinkers is suitable. In a preferred embodiment, the polyvinylaromatic monomer is divinylbenzene.

Optionally, non-aromatic crosslinking monomers, such as ethyleneglycol diacrylate, ethyleneglycol dimethacrylate, trimethylolpropane triacrylate, trimethylolpropane trimethacrylate, diethyleneglycol divinyl ether, and trivinylcyclohexane, may be used in addition to the polyvinylaromatic cross linker.

Suitable monounsaturated vinylaromatic monomers that may be used in the preparation of crosslinked copolymers include, for example, styrene, α-methylstyrene, ($C_1$-$C_4$) alkyl-substituted styrenes, halo-substituted styrenes (such as dibromostyrene and tribromostyrene), vinylnaphthalene, and vinylanthracene. Preferably, the monounsaturated vinylaromatic monomer is selected from styrene, ($C_1$-$C_4$)alkyl-substituted styrenes, and mixtures thereof. Included among the suitable ($C_1$-$C_4$)alkyl-substituted styrenes are, for example, ethylvinylbenzenes, vinyltoluenes, diethylstyrenes, ethylmethylstyrenes, and dimethylstyrenes. It is understood that any of the various positional isomers of each of the aforementioned vinylaromatic monomers is suitable. Optionally, non-aromatic monounsaturated vinyl monomers, such as aliphatic unsaturated monomers, for example, vinyl chloride, acrylonitrile, (meth)acrylic acids, and alkyl(meth)acrylates, may be used in addition to the vinylaromatic monomer.

Porogens may also be used in preparing macroporous copolymers. Suitable porogens include hydrophobic porogens, such as ($C_7$-$C_{10}$)aromatic hydrocarbons and ($C_6$-$C_{12}$) saturated hydrocarbons, and hydrophilic porogens, such as ($C_4$-$C_{10}$)alkanols and polyalkylene glycols. Suitable ($C_7$-$C_{10}$)aromatic hydrocarbons include, for example, one or more of toluene, ethylbenzene, ortho-xylene, meta-xylene and para-xylene; it is understood that any of the various positional isomers of each of the aforementioned hydrocarbons is suitable. Preferably, the aromatic hydrocarbon is toluene or xylene or a mixture of xylenes or a mixture of toluene and xylene. Suitable ($C_6$-$C_{12}$)saturated hydrocarbons include, for example, one or more of hexane, heptane and isooctane; preferably, the saturated hydrocarbon is isooctane. Suitable ($C_4$-$C_{10}$)alkanols include, for example, one or more of isobutyl alcohol, tert-amyl alcohol, n-amyl alcohol, isoamyl alcohol, methyl isobutyl carbinol (4-methyl-2-pentanol), hexanols and octanols; preferably, the alkanol is selected from one or more ($C_5$-$C_8$)alkanols, such as, methyl isobutyl carbinol and octanol.

Polymerization initiators useful in preparing copolymers include monomer-soluble initiators, such as peroxides, hydroperoxides and related initiators, for example benzoyl peroxide, tert-butyl hydroperoxide, cumene peroxide, tetralin peroxide, acetyl peroxide, caproyl peroxide, tort-butyl peroctoate (also known as tort-butylperoxy-2-ethylhexanoate), tert-amyl peroctoate, tert-butyl perbenzoate, tert-butyl diperphthalate, dicyclohexyl peroxydicarbonate, di(4-tert-butylcyclohexyl)peroxydicarbonate, and methyl ethyl ketone peroxide. Also useful are azo initiators, such as azodiisobutyronitrile, azodiisobutyramide, 2,2'-azo-bis(2,4-dimethylvaleronitrile), azo-bis(α-methylbutyronitrile) and dimethyl-, diethyl- or dibutyl azo-bis(methylvalerate).

The copolymer may include a quaternary ammonium functionality comprising a nitrogen atom bonded to a benzyl carbon of the copolymer and three alkyl groups, wherein each alkyl group independently comprises from 1 to 8 carbon atoms. The copolymer may be functionalized via any conventional processes, such as haloalkylation (e.g., chloromethylation) followed by amination (e.g., via reaction with a tertiary amine such as tributyl amine).

Catalysts useful for conducting haloalkylation reactions are well known and are often referred to in the art as a "Lewis acid" or "Friedel-Crafts" catalyst. Nonlimiting examples include zinc chloride, zinc oxide, ferric chloride, ferric oxide, tin chloride, tin oxide, titanium chloride, zirconium chloride, aluminum chloride, sulfuric acid, and combinations thereof. Halogens other than chloride may also be used.

Solvents and/or swelling agents may also be used in the haloalkylation reaction. Examples of suitable solvents include aliphatic hydrocarbon halides, such as ethylene dichloride, dichloropropane, dichloromethane, chloroform, diethyl ether, dipropyl ether, dibutyl ether, diisoamyl ether, and combinations thereof.

Once haloalkylated, the resin may be aminated via conventional processes such as described in U.S. Publication No. 2004/025697; U.S. Pat. No. 4,564,644 and U.S. Pat. No. 6,924,317, the entire contents of which are incorporated herein by reference. Amination may be performed by combining the haloalkylated resin (preferably, pre-washed) with an amine solution. For strong base anion resins, the amine species is preferably a tertiary amine. For weak base anion resins, the amine species is preferably a secondary amine. The amine solution may comprise a slurry solvent of alcohol (e.g., methanol) and optionally water and may include a swelling agent, such as methylal or ethylene dichloride. The amine solution may also include an inorganic salt such as sodium chloride. Additionally, the pH of the amine solution may be adjusted to 7 or slightly alkaline.

The nitrosating agent of the anion exchange resin may comprise any material capable of nitrosating a nitrosatable nitrogen functional group. Such nitrosating agents include nitrite salts, such as $N_2O_3$, and are generally thought to nitrosate by reaction of the nitrosonium ion with the amine from the resin. These nitrosating agents may be contained as trace impurities in the raw amines used to manufacture the anion resins as trace $NO_2^-$ from water or salt sources that further degrade to transient $NO^+$ species as side products generated during storage. Such species can then further react with trace amines in the resin to generate N-nitrosamines.

The method further includes applying an antioxidant to the resin to inhibit formation of nitrosamines on the resin. Nitrosamines include N-Nitrosodiethylamine (NDEA), N-Nitrosodimethylamine (NDMA), N-Nitrosodi-n-propylamine (NDPA), N-Nitrosodi-n-butylamine (NDBA), N-Nitrosomethylethylamine (NMEA), N-Nitrosomorpholine, N-Nitrosopiperidine (NPIP), N-nitrosodiethanolamine (NDELA), N-nitrosomorpholine (NMOR), N-nitrosodicyclohexylamine, N-Nitrosodicyclohexylamine, N-nitrosomethyl(benzyl)amine, N-nitrosonomicotine, and N-Nitrosopyrrolidine (NYPR).

The classical synthesis of N-nitrosamines is the reaction of a secondary amine with acidic nitrite at a pH of about 3 or less. Nitrous acid ($HNO_2$) or its anhydride ($N_2O_3$) is the nitrosating agent. Nitrite ions react with protons in aqueous solution to produce nitrous acid and $N_2O_3$.

The reaction is pH dependent, where the greater the concentration of protons, the more nitrous acid that is produced as the equilibrium is pushed to the right of the stoichiometric equation.

It is assumed that the direct nitrosating species is the nitronium ion ($NO^+$) produced by ionic dissociation of nitrous acid or $N_2O_3$.

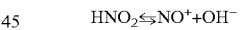

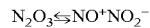

This species may react with secondary amines expelling a proton to produce a nitrosamine.

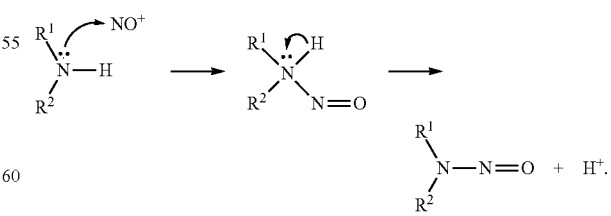

The antioxidant applied to the anion exchange resin disrupts the nitronium ion formation, limits the further reaction with the secondary or primary amines and thus, limits the nitrosamine formation. At very low trace levels, amines that are oxidized from the resin can readily rearrange to be primary or secondary amines. Antioxidants useful in the invention are substances that inhibit nitrosamine formation. Exemplary antioxidants include erythorbic acid, thiodipropionic acid, potassium metabisulfite, ascorbyl palmitate, sorbic acid, vitamin E (tocopherols), 1,3,5-trimethyl-2,4,6-tris(3,5-di-tert-butyl-4-hydrodybenzyl)benzene, octadecyl-3-(3,5-di-t-butyl-4-hydroxyphenyl)propionate, ascorbic acid, 2,6-di-tertiary-butyl-N,N-dimethylamino-P-cresol, and mixtures thereof.

Preferably, the weight ratio of antioxidant to wet anion exchange resin is at least 1:1000. For resins seeing minimal heat stress and shorter storage times (<6 months), the weight ratio can be as low as 1:5000. For resins stored at higher than ambient temperatures and/or for longer periods of time (>24 months), a higher weight ratio of 1:500 is preferred.

Typically, the antioxidant is blended with the anion exchange resin and then the anion exchange resin is drained. The antioxidant may first be dissolved in a nonreacting solvent and then the antioxidant solution may be contacted with the anion exchange resin for a sufficient period of time. The resin may be hydrated or dried before contact with the antioxidant solution is made.

When the formation of the nitrosamines are inhibited according to the invention, the anion exchange resin comprises, preferably, no more than 15 ng/L nitrosamines, more preferably, no more than 10 ng/L nitrosamines, and most preferably, no more than 5 ng/L nitrosamines. With the ranges being as low as non-detect, the volumes of pre-wash resin rinsing lessen and, in some cases, are not needed before the resin bed can be brought into service.

The invention is also directed to an anion exchange resin comprising a resin having a crosslinked polycondensate of phenol formaldehyde, an amine, and a nitrosating agent and an antioxidant applied to the resin that inhibits formation of nitrosamines on the resin. During storage, this antioxidant-treated anion exchange resin offers less development of trace nitrosamines, which eliminates or greatly reduces the volumes of pre-water rinse required in order to use the resins for such applications as perchlorate, nitrate, and other potable water applications.

The following examples are presented to illustrate the invention. In the examples, the following abbreviations have been used.

DI is deionized.

g is gram; ng is nanogram; gal is gallon; L is liter; mL is milliliter; and bv is bed volume.

DX1 is DOWEX 1, a type 1 strong base anion resin, trimethyl amine in the Cl⁻ form, on a gel copolymer available from The Dow Chemical Company, Midland, Mich.

DX PSR-2 is DOWEX PSR-2, a tri-n-butyl amine resin, Cl⁻ form, on a gel copolymer available from The Dow Chemical Company, Midland, Mich.

DX PSR-3 is DOWEX PSR-3, a tri-n-butyl amine resin, Cl⁻ form, on a macroporous copolymer available from The Dow Chemical Company, Midland, Mich.

Ionac SR-7 is a tripropyl amine resin, Cl⁻ form, on a macroporous copolymer available from The Dow Chemical Company, Midland, Mich.

M is molar.

N is normal.

Soln is solution.

ND is non detect.

TEST METHODS

Baseline Data:

To initially establish baseline data on various DOWEX™ anion resins and to secure some comparative testing information between analytical methods, simple bottle extractions were evaluated using a static testing method as follows. Stable isotopically labeled analogs of the compounds of interest were added to a one liter wastewater sample. The sample was extracted at a pH of 12-13, then at pH<2 with methylene chloride using continuous extraction techniques. The extract was dried over sodium sulfate and concentrated to a volume of 1 mL. An internal standard was added to the extract, and the extract was injected into the gas chromatograph (GC). The compounds were separated by GC and detected by a mass spectrometer (MS). The labeled compounds served to correct the variability of the analytical technique. Identification of a compound (qualitative analysis) was performed by comparing the GC retention time and background corrected characteristic spectral masses with those of authentic standards. Quantitative analysis was performed by GC/MS using extracted ion current profile (EICP) areas. Isotope dilution was used when labeled compounds were available; otherwise, an internal standard method was used. Quality was assured through reproducible calibration and testing of the extraction and GC/MS systems.

Nitrosamine Testing:

Samples were sent to a nitrosamine testing labs, such as Test America, West Sacramento, Calif., Week Labs Inc., Industry, Calif., and MWH Laboratories, Scottsdale Ariz. These labs conduct Unregulated Contaminant Monitoring Regulation 2 (UCMR2) List 2 (Herbicides, Herbicide Degradation Products, and Nitrosamines) testing services. UCMR2 is a federal monitoring requirement sponsored by the EPA as part of a program that investigates chemical, radiological and microbiological contaminant occurrence in an effort to characterize drinking water threats.

EXAMPLES

Anion exchange amines, DOWEX 1, DOWEX PSR-2, and DOWEX PSR-3, were weighed out at 1000 g each as dewatered and Ionac SR-7 was weighed out at 250 g as dewatered and placed into new 1 gal glass jars on Dec. 28, 2007. A solution of 1 g ascorbic acid in 100 mL 7% hydrochloric acid was added to the resin, followed by 1500 mL DI water (ratios were adjusted for Ionac resin). The pH of the solutions and the solution mixed with resin after 3 hours was recorded. The resin was allowed to soak in the solution for 2 months, after which it was drained off, rinsed with about 4 bv DI water, and dewatered. The resin pretreated in this manner is described below as "Treated".

On Mar. 10, 2008, 200 mL of each resin was removed and added to a fresh jar with 1 L of 0.5 M sodium nitrate adjusted to a pH of 5.5 with 1N nitric acid. The pH of the solution mixed with resin was recorded on Mar. 19, 2008 and Apr. 5, 2008. After one month, the liquid was poured off and analyzed. The bottles were numbered for ease of data recognition.

Results

| Bottle | Description | pH Soln | pH Soln + resin 3 hr | pH Soln + resin Mar. 19, 2008 | pH Soln + resin Apr. 5, 2008 | N-Nitrosamine levels ng/L |
|---|---|---|---|---|---|---|
| 1 | DX1 Treated | 5.47 | 4.01 | 3.66 | 4.04 | ND |
| 2 | DX1 Virgin | 5.5 | 7.68 | 7.03 | 7.69 | 2.4 N-Nitosodimethylamine |
| 3 | DX PSR-2 Treated | 5.49 | 3.75 | 3.35 | 3.53 | 5 N-Nitrosodi-n-butylamine |
| 4 | DX PSR-2 Virgin | 5.43 | 4.1 | 3.72 | 3.98 | 30 N-Nitrosodi-n-butylamine |
| 5 | DX PSR-3 Treated | 5.6 | 3.38 | 3.05 | 3.21 | 15 N-Nitrosodi-n-butylamine |
| 6 | DX PSR-3 Virgin | 5.41 | 3.92 | 3.49 | 3.55 | 74 N-Nitrosodi-n-butylamine |
| 7 | Ionac SR-7 Treated | 5.56 | 2.88 | 2.62 | 2.85 | ND |
| 8 | Ionac SR-7 Virgin | 5.57 | 8.36 | 7.92 | 8.35 | 16 N-Nitrosodi-n-propylamine |
| Soln Blank | 0.5M NaNO$_3$ pH 5.5 | 5.53 |  | 5.36 | 5.83 | ND |

What is claimed is:

1. A method for inhibiting formation of nitrosamines comprising:
   providing an anion exchange resin together with a nitrite salt, wherein the nitrite salt is present in an amount of 100 ng/L; and
   applying an antioxidant to the resin by blending the antioxidant with the anion exchange resin to inhibit formation of nitrosamines on the anion exchange resin such that the anion exchange resin comprises no more than 15 ng/L nitrosamines, wherein the applying comprises
   providing a solution of the antioxidant in a nonreacting solvent;
   blending the solution with the anion exchange resin; and then draining the solution from the anion exchange resin,
   wherein a weight ratio of the antioxidant to the wet anion exchange resin is from 1:5000 to 1:500.

2. The method of claim 1 wherein the antioxidant comprises at least one of erythorbic acid, thiodipropionic acid, potassium metabisulfite, ascorbyl palmitate, sorbic acid, vitamin E (tocopherols),
   1,3,5-trimethyl-2,4,6-tris(3,5-di-tert-butyl-4-hydrodybenzyl)benzene,
   octadecyl-3-(3,5-di-tert-butyl-4-hydroxyphenyl)propionate,
   ascorbic acid and
   2,6-di-tertiary-butyl-N,N-dimethylamino-p-cresol
   2,6-di-tert-butyl-N,N-dimethylamino-p-cresol.

3. The method of claim 1 further comprising:
   disrupting formation of nitronium ions; and
   limiting reaction of the nitronium ions with secondary amines.

4. The method of claim 1, wherein the ion exchange resin has been made using one or more polyunsaturated vinylaromatic monomer and one or more monounsaturated vinylaromatic monomer.

5. The method of claim 4, wherein the ion exchange resin has been made using monomers comprising: one or more monomer selected from the group consisting of divinylbenzene, trivinylbenzene, divinyltoluene, divinylnaphthalene, divinylxylene, and mixtures thereof and one or more monomer selected from the group consisting of styrene, ($C_1$-$C_4$) alkyl-substituted styrenes, halo-substituted styrenes, vinylnaphthalene, vinylanthracene, and mixtures thereof.

6. The method of claim 1, wherein the nitrite salt is either an impurity from a raw amine used in the amination or is trace $NO_2^{\ominus}$ from water or salt used in the amination.

7. An anion exchange resin prepared using the method of claim 1.

* * * * *